Figures 1, 2:
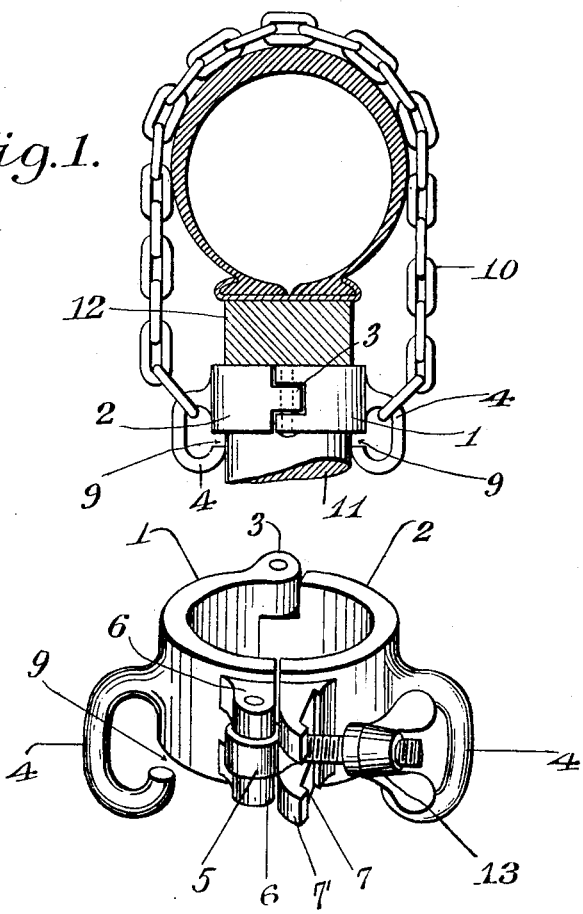

W. CHIRPE AND C. H. LUNDGREN.
NON-SKID CHAIN DEVICE.
APPLICATION FILED NOV. 1, 1919.

1,364,714.

Patented Jan. 4, 1921.

UNITED STATES PATENT OFFICE.

WILLIAM CHIRPE AND CHARLES HOLGER LUNDGREN, OF CHICAGO, ILLINOIS; SAID LUNDGREN ASSIGNOR TO SAID CHIRPE.

NON-SKID-CHAIN DEVICE.

1,364,714. Specification of Letters Patent. Patented Jan. 4, 1921.

Application filed November 1, 1919. Serial No. 335,176.

*To all whom it may concern:*

Be it known that we, WILLIAM CHIRPE and CHARLES HOLGER LUNDGREN, citizens of the United States, residing at Chicago, in the county of Cook and State of Illinois, have invented certain new and useful Improvements in Non-Skid-Chain Devices, of which the following is a specification.

The object of this invention is to provide a non-skid chain device which can be easily and quickly applied to a vehicle wheel to prevent skidding and slipping and which can be as easily and quickly removed from the wheel when its use is no longer desired.

And a further object of the invention is to provide a device comprising a chain to extend transversely over the tire and a clamp for securing the chain to a spoke of the wheel, the chain being detachable from the clamp when the latter is disengaged from the spoke but being securely held and prevented from disengagement with the clamp when the latter is engaged with a spoke.

In the accompanying drawings illustrating a selected embodiment of our invention, Figure 1 is a sectional view showing a portion of a pneumatic tired wheel with our invention applied thereto.

Fig. 2 is a perspective view of the clamp.

Referring to the drawings, the clamp comprises two members or halves 1 and 2, which are hinged together in any suitable manner at 3. Each member of the clamp is provided with a depending hook 4, which is attached to the side of the member and has its end disposed beneath the member and spaced therefrom to provide an opening 9, through which a link of the chain 10 may be inserted to engage the chain with the hook and clamp member. A locking bolt 5 is swiveled in lugs 6 on one member and is arranged to be engaged with a recess 7 in the locking lug 7' on the other member, the two members being clamped tightly on a spoke 11 of the wheel beneath the felly 12 by adjusting the thumb nut 13.

To apply the device to a vehicle wheel the chain is engaged with one hook 4 by slipping a link through the opening 9 and then the clamp is arranged on a spoke close up against the felly and the chain passed around the tire and engaged with the other hook 4, after which the bolt is engaged with the locking lug and the screw adjusted to secure the clamp tightly on the spoke. The end links of the chain may be engaged with the hooks if the chain is of the proper length to fit a tire, or other links may be so engaged with the hooks if this chain is applied to a smaller tire or a longer chain is used. The chain will, of course, be sufficiently loose on the tire to provide the desired anti-skidding and anti-slipping effect, in the manner well known in the art.

It will be noted that the chain is readily detachable from the clamp when the clamp is detached from the spoke, and on the other hand the chain is not detachable from the clamp when the latter is secured on a spoke because the hooks are inwardly directed and the ends thereof will engage or lie so close to the spoke that the chain links cannot pass through the openings 9. This prevents the loss of the chain in event that a link breaks or wears out, and at the same time it enables the chain to be readily removed from the clamp for replacement or repair or readjustment.

The invention is simple in construction, it comprises only a few parts which can be made strong and substantial and it can be easily and quickly applied to and removed from a wheel. The chain is automatically locked in position on the wheel when the clamp is secured in place thereon. These features and advantages make the device highly desirable for the use for which it is intended since it generally happens that such devices must be applied to the wheel while the vehicle is in actual use.

We claim:

1. In a non-skid chain device, a clamp adapted to embrace a spoke of a wheel, hooks on said clamp projecting in the same direction beyond one end of the clamp and on opposite sides thereof, means for detachably securing said clamp on the spoke, and a chain adapted to be engaged with said hooks before the clamp is tightened on the spoke, the ends of said hooks being positioned close to the spoke when the clamp is secured in place to prevent disengagement of the chain.

2. In a non-skid chain device, a clamp adapted to embrace a spoke of a wheel, hooks on said clamp projecting in the same direction beyond one end of the clamp and on opposite sides thereof, said hooks being inwardly directed and having their ends arranged in opposition to the ends of the clamp and spaced therefrom to permit engagement of a chain with the hooks, means for securing the clamp on the spoke, and a chain adapted to be engaged with said hooks before the clamp is tightened on the spoke, the ends of said hooks being positioned close to the spoke when the clamp is secured in place to prevent disengagement of the chain.

WILLIAM CHIRPE.
CHARLES HOLGER LUNDGREN.